United States Patent
Daniel et al.

(10) Patent No.: US 9,160,846 B2
(45) Date of Patent: Oct. 13, 2015

(54) ELECTRONIC SYSTEM AND METHOD FOR SCREENING INCOMING COMMUNICATIONS

(71) Applicants: Isaac S. Daniel, Miramar, FL (US); Alberto Interian, III, Miramar, FL (US)

(72) Inventors: Isaac S. Daniel, Miramar, FL (US); Alberto Interian, III, Miramar, FL (US)

(73) Assignee: Lead Technology Capital Management, LLC

( * ) Notice: Subject to any disclaimer, the term of this patent is extended or adjusted under 35 U.S.C. 154(b) by 0 days.

(21) Appl. No.: 14/148,711

(22) Filed: Jan. 6, 2014

(65) Prior Publication Data

US 2014/0219430 A1 Aug. 7, 2014

Related U.S. Application Data

(60) Provisional application No. 61/749,065, filed on Jan. 4, 2013.

(51) Int. Cl.
| | | |
|---|---|---|
| *H04M 11/00* | (2006.01) | |
| *H04M 1/56* | (2006.01) | |
| *H04M 15/06* | (2006.01) | |
| *H04M 3/436* | (2006.01) | |
| *H04M 3/42* | (2006.01) | |
| *H04M 3/02* | (2006.01) | |

(52) U.S. Cl.
CPC .......... *H04M 3/436* (2013.01); *H04M 3/42068* (2013.01); *H04M 3/02* (2013.01); *H04M 3/42382* (2013.01)

(58) Field of Classification Search
CPC ... H04M 1/57; H04M 1/663; H04M 1/72547; H04M 3/436; H04M 3/42042; H04Q 2213/13091; H04Q 2213/13256; H04Q 2213/13274

USPC ........ 379/74, 88.02, 88.19, 88.2, 88.21, 379/92.03, 92.04, 93.17, 93.23, 142.01, 379/142.02, 142.05, 142.06, 142.13, 379/142.15, 142.17, 207.13, 207.15

See application file for complete search history.

(56) References Cited

U.S. PATENT DOCUMENTS

| | | | | |
|---|---|---|---|---|
| 4,266,098 | A * | 5/1981 | Novak | 379/77 |
| 6,160,877 | A * | 12/2000 | Tatchell et al. | 379/197 |
| 6,553,110 | B1 * | 4/2003 | Peng | 379/210.03 |
| 7,295,660 | B1 * | 11/2007 | Higginbotham et al. | 379/196 |
| 7,433,923 | B2 * | 10/2008 | Adkins | 709/206 |
| 7,489,766 | B2 * | 2/2009 | Morganstein et al. | 379/88.02 |
| 7,542,555 | B2 * | 6/2009 | Caswell et al. | 379/93.02 |
| 7,693,944 | B2 * | 4/2010 | Appelman et al. | 709/206 |
| 8,249,224 | B2 * | 8/2012 | Creamer et al. | 379/88.01 |
| 8,374,328 | B2 * | 2/2013 | Saha et al. | 379/210.02 |
| 8,391,930 | B1 * | 3/2013 | Delker et al. | 455/567 |
| 8,750,482 | B2 * | 6/2014 | Chingon et al. | 379/210.02 |
| 8,892,072 | B2 * | 11/2014 | Mun et al. | 455/411 |
| 2004/0131168 | A1 * | 7/2004 | Tischler | 379/207.15 |
| 2005/0182767 | A1 * | 8/2005 | Shoemaker et al. | 707/10 |
| 2008/0045186 | A1 * | 2/2008 | Black et al. | 455/413 |
| 2008/0144782 | A1 * | 6/2008 | Chou | 379/88.01 |
| 2008/0159502 | A1 * | 7/2008 | Venkatesulu et al. | 379/142.06 |
| 2009/0080624 | A1 * | 3/2009 | Small et al. | 379/88.21 |
| 2009/0157732 | A1 * | 6/2009 | Hao et al. | 707/102 |

(Continued)

*Primary Examiner* — Binh Tieu

(74) *Attorney, Agent, or Firm* — Alberto Interian, III, Esq.

(57) ABSTRACT

The present invention relates generally to electronic systems and methods for screening incoming phone calls and more particularly to a system and method of hosting a cloud synced database of authorized or unauthorized callers, phone numbers, or numbers associated with unauthorized merchant identification numbers which is a solution to robo-calling and telemarketers.

20 Claims, 7 Drawing Sheets

(56) References Cited

U.S. PATENT DOCUMENTS

| | | |
|---|---|---|
| 2009/0168755 A1* | 7/2009 | Peng et al. .................... 370/352 |
| 2010/0246795 A1* | 9/2010 | Saha et al. ............... 379/210.02 |
| 2011/0124371 A1* | 5/2011 | Li et al. ..................... 455/556.1 |
| 2011/0185028 A1* | 7/2011 | Goldman et al. ............. 709/206 |
| 2011/0205936 A1* | 8/2011 | Vanier et al. .................. 370/259 |
| 2011/0222675 A1* | 9/2011 | Chua et al. .................. 379/93.01 |
| 2012/0020467 A1* | 1/2012 | Appelman et al. ......... 379/88.11 |

* cited by examiner

ELECTRONIC SYSTEM AND METHOD FOR SCREENING INCOMING COMMUNICATIONS

PRIORITY CLAIM

The present application claims priority to U.S. provisional patent application Ser. No. 61/749,065, filed on Jan. 4, 2013, titled "Electronic System and Method for Screening Incoming Phone Calls," by Daniel et al., whose entire disclosure is incorporated by reference herein.

FIELD OF THE INVENTION

The present invention relates generally to electronic systems and methods for screening incoming communications and more particularly to a system and method of hosting a cloud synced database of authorized or unauthorized callers, phone numbers, or numbers associated with unauthorized merchant identification numbers.

BACKGROUND OF THE INVENTION

Modern technology has provided users with seemingly innumerable means of communicating with each other, such as smartphones, tablet PCs, telephones, video phones, teleconferencing equipment, text messaging, instant messaging, social networking, and the like.

At the same time, advertisers are leveraging these channels of communication to deliver an ever increasing number of advertisements to users. This overabundance of advertisement often irritates users, and one of the most obnoxious forms is unsolicited telemarketing phone calls and automated marketing phone calls ("robocalls") and text messages. Sometimes the communications are actually fraudulent, and users inadvertently give valuable financial or identification information away to criminals.

SUMMARY OF THE INVENTION

The various embodiments of systems and methods disclosed herein result from the realization that annoying telemarketing communications may be screened by providing systems and methods that are configured to screen incoming communications, identify senders, check databases of authorized or unauthorized senders, and either block the communications or allow recipients to receive the communications or perform other functions, such as designating senders as authorized senders, forwarding communications to other devices, and the like.

Systems and methods may be provided for syncing the screening functions and settings across a plurality of user devices and servers, including mobile devices, home call screening devices, and the like.

Home and office systems for screening communications may be provided that are configured to connect to telephone land lines and to local telephone devices, connect to server to access sender databases and receive system updates, and connect to remote user devices to forward communications or screening functions to the remote user devices.

DETAILED DESCRIPTION OF PREFERRED EMBODIMENTS

Figure 1A:
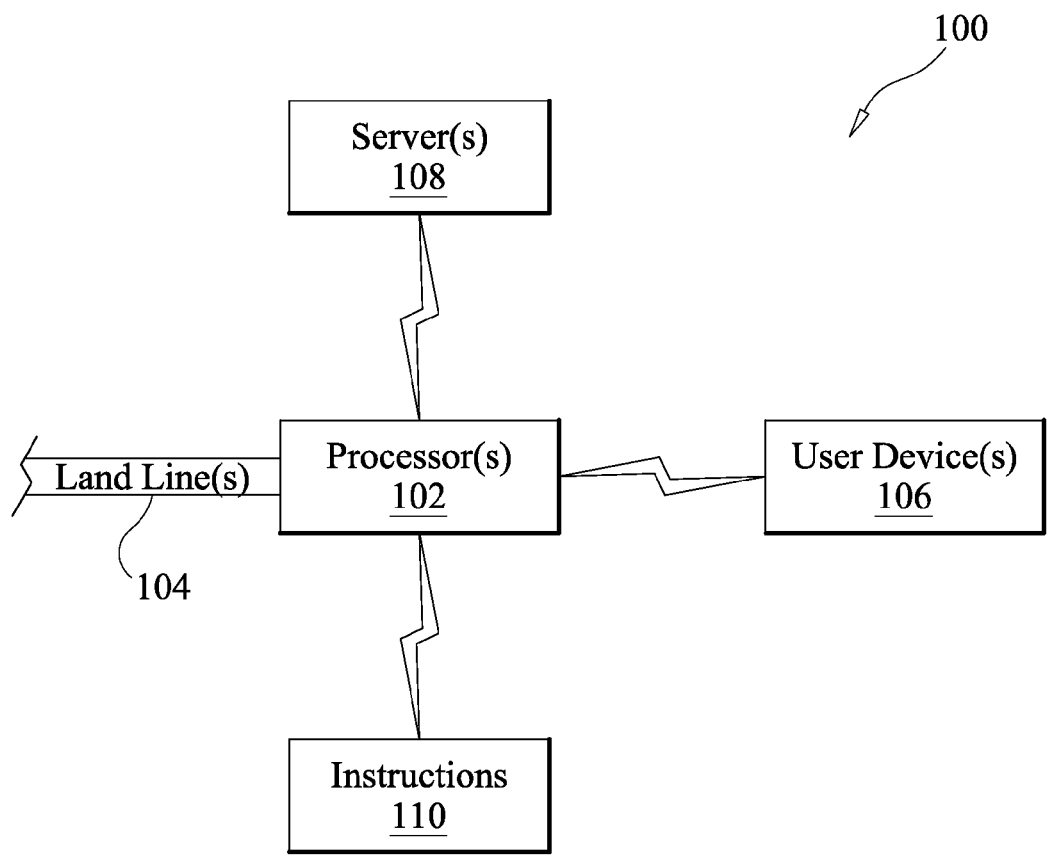
FIGS. 1A-1c show a block diagrams depicting systems in accordance with various embodiments.

Referring now to FIG. 1A, a block diagram is shown depicting a system 100 for screening incoming communications in accordance with one embodiment, wherein system 100 comprises a processor 102 configured to connect to a telephone land line 104, a local user device 106, and a remote server 108, and computer executable instructions 110 readable by processor 102 and configured to receive a communication via telephone land line 104, identify a sender of the communication, access a database of unauthorized or authorized senders, determine if the sender is unauthorized, authorized, or unknown, and if the sender is authorized, then present the communication as an authorized communication on local user device 106, if the sender is unauthorized, then not present the communication on local user device 106 or present the communication as an unauthorized communication on local user device 106, and if the sender is unknown, then not present the communication on local user device 106, or present the communication as an unknown communication on local user device 106.

In some embodiments, the processor may be part of a screening device, such as a screening dongle (shown as 112 in FIG. 1B), which may include a housing to house processor 102 and a storage device connected to processor 102, such as computer memory. Computer executable instructions 110 may be stored on the storage device. Screening dongle 112 may include communications ports to which telephone land line 104 and user device 106, which may comprise a telephone 114, may be connected. Accordingly, screening dongle 112 may interconnect telephone 114 and telephone land line 104. Screening dongle 112 may be configured to connect to server 108 via communications network 116, such as a wide area network, which may include a world wide web. Screening dongle 112 may be further configured to connect with a mobile communications device 118, such as a mobile phone or smart phone. Screening dongle 112 may connect with mobile communications device 118 via network 116, a cellular network, a wireless local area network ("WLAN"), a local wireless communications protocol, such as BLUETOOTH®, and the like. Accordingly, screening dongle 112 may comprise a communications module, such as a WLAN module, a cellular modem, and the like. Screening dongle 112 may be further configured to connect to a wireless access point, which may in turn be connected to an internet modem.

In yet another embodiment, processor 102 may be part of a user device (shown as 120 in FIG. 1C), such as a smartphone, tablet PC, or PC, which may be configured to removably connect to a docking station 122. Docking station 122 may be configured to connect to telephone land line 104 and telephone 114. User device 120 may receive the communications via docking station 122, and may forward the communications to the telephones via docking station 122. In some embodiments, docking station 122 and/or user device 120 may be configured to connect to server 108. Computer executable instructions 110 may reside on user device 120 and may use user device 120 to carry out the various functions/steps of computer executable instructions 110.

In some embodiments, local user device 106 may comprise a telephone, such as a land line, a computer, or a mobile device, such as a smartphone, and the like.

In some embodiments, the communication may comprise any type of communication, including, but not limited to a telephone call, a text message ("SMS"), an e-mail, a fax, a voicemail, a multimedia message ("MMS"), a social media message, video call, and the like.

In some embodiments, the sender may be a person or an automated sender, such as in the case of robocalls. In other embodiments, the sender may be a telemarketer or advertiser.

In some embodiments, identifying a sender of the communication may comprise determining an identifier associated with the sender, such as a name, telephone number, e-mail address, and the like. The identifier may be extracted using caller ID technology, or may be determined by analyzing meta-data associated with the communication. In other embodiments, identifying a sender may comprise requesting that a sender identify him or herself.

In some embodiments, accessing a database may comprise accessing a local database. The local database may be hosted by a computer readable medium connected to processor 102, which may include being connected to dongle 112, user device 120, or docking station 122.

In other embodiments, the database may comprise a remote database, such as a database may be hosted by server 108. Server 108 may comprise a cloud server.

In some embodiments, the computer executable instructions may be configured to sync a local database with a remote database, and conversely, sync the remote database with the local database. In some embodiments, system 100 may include various databases hosted by a plurality of devices, such as server 108, user device 106, docking station 122, telephone 114, and the like. Accordingly, the various databases may be synced across the plurality of devices.

The database may contain a list of unauthorized or authorized senders. The list may be edited by a user. The list may be imported from a user's contact list residing on a user's computer, mobile device, or cloud data service provider. In yet another embodiment, the list may be imported from a public do-not-call registry, which may be hosted by a government entity.

In some embodiments, a service provider may host an authorized advertiser database, which may be imported to the list of authorized users. Advertisers may pay be required to pay fees in order to be a part of the authorized database, and may be required to comply with certain rules and regulations, which may include number of advertisements sent, hours during which advertisements are sent, types of advertisements sent, content of advertisements sent, and/or frequency with which advertisements are sent.

In some embodiments, presenting a communication as an authorized communication on local user device 106 may comprise presenting a visual notification indicating that the communication is authorized, such as by displaying a message, image, or light indicating that the communication is authorized. In another embodiment, presenting a communication as an authorized communication on local user device 106 may comprise presenting an audible notification that the communication is authorized, such as by playing a ringtone, sound or audible message associated with authorized communications. In yet another embodiment, presenting a communication as an authorized communication on local user device 106 may comprise presenting a tactile notification that the communication is authorized, such as by presenting a vibration indicating that the communication is authorized. In other embodiments, the communication may be presented in a normal fashion, or as local user device 106 would usually present a communication.

In some embodiments, not presenting the communication may comprise blocking the communication or not forwarding the communication to local user device 106.

In some embodiments, presenting a communication as an unauthorized communication on local user device 106 may comprise visually indicating that the communication is unauthorized, such as by displaying a message, image, or light indicating that the communication is unauthorized. In another embodiment, presenting a communication as an unauthorized communication on local user device 106 may comprise presenting an audible notification that the communication is unauthorized, such as by playing a ringtone, sound or audible message associated with unauthorized communications. In yet another embodiment, presenting a communication as an unauthorized communication on local user device 106 may comprise tactile notification that the communication is unauthorized, such as by presenting a vibration indicating that the communication is unauthorized. In other embodiments, the communication may be presented in a normal fashion, or as local user device 106 would usually present a communication.

In some embodiments, presenting a communication as an unknown communication on local user device 106 may comprise presenting a visual notification that the communication is unknown, such as by displaying a message, image, or light indicating that the communication is unknown. In another embodiment, presenting a communication as an unknown communication on local user device 106 may comprise presenting an audible notification that the communication is unknown, such as by playing a ringtone, sound or audible message associated with unknown communications. In yet another embodiment, presenting a communication as an unknown communication on local user device 106 may comprise presenting a tactile notification that the communication is unknown, such as by presenting a vibration indicating that the communication is unknown. In other embodiments, the communication may be presented in a normal fashion, or as local user device 106 would usually present a communication.

Accordingly, local user device 106 may comprise a display device, such as a screen or light, an audio playing device, such as a speaker, and a tactile feedback device, such as a vibrator.

In some embodiments, computer executable instructions 110 may be configured to present, on local user device 106, an option to designate an unauthorized or unknown sender as an unauthorized or authorized sender in the database. This may comprise displaying a menu to a user, wherein the user may be presented with an option to select or designate a sender as an unauthorized or authorized sender.

In some embodiments, computer executable instructions 110 may be configured to present the communication to a remote user device, which may be presented via network 116. The remote user device may comprise any type of user device, such as a computer or a mobile device, which may include a smartphone, tablet PC, cellular phone, and the like.

Figure 2:
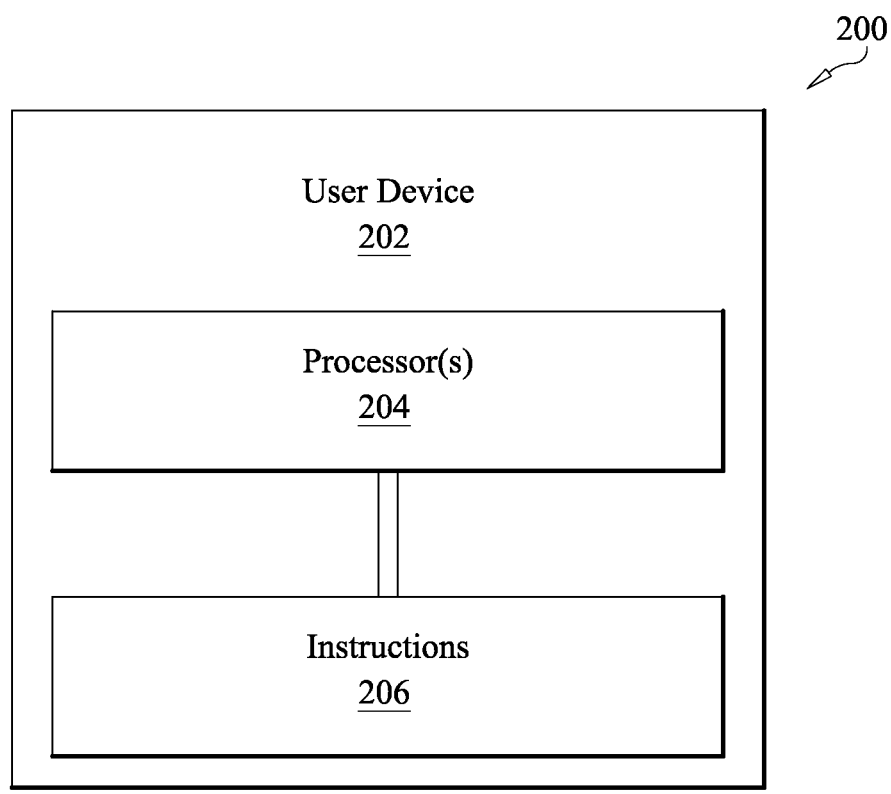
FIG. 2 shows a block diagram depicting a system in accordance with one embodiment.

Referring now to FIG. 2, a block diagram is shown depicting a system 200 for screening incoming communications, wherein system 200 comprises a user device 202 comprising a processor 204, and computer executable instructions 204 readable by processor 204 and configured to receive a communication, identify a sender of the communication, access a database of unauthorized or authorized senders, determine if the sender is unauthorized, authorized, or unknown, and if the sender is authorized, then present the communication as an authorized communication on user device 202, if the sender is unauthorized, then not present the communication on user device 202 or present the communication as an unauthorized communication on user device 202, and if the sender is unknown, then not present the communication on user device 202, or present the communication as an unknown communication on user device 202.

In some embodiments, user device 202 may comprise a mobile communications device, such as, but not limited to, a smartphone, a tablet PC, and the like.

In some embodiments, computer executable instructions 206 may reside on a computer readable medium that is readable by processor 204. Computer executable instructions 206 may comprise a software or computer application, such as a downloadable mobile application.

In some embodiments, the communication may comprise any of those embodiments described throughout the present disclosure.

In some embodiments, identifying a sender of the communication may comprise any of those embodiments described throughout the present disclosure.

Accessing a database of unauthorized or authorized senders may comprise any of those embodiments described throughout the present disclosure. The database may comprise a local database, residing on user device 202, or may comprise a remote database residing on a server, to which user device 202 may be configured to connect to. The database may comprise any of those embodiments described throughout the present disclosure, and the server may comprise any of those embodiments described throughout the present disclosure.

In some embodiments, determining if the sender is unauthorized, authorized, or unknown may comprise any of those embodiments described throughout the present disclosure.

In some embodiments, presenting a communication as an authorized communication on user device 202 may comprise presenting a visual notification indicating that the communication is authorized, such as by displaying a message, image, or light indicating that the communication is authorized. In another embodiment, presenting a communication as an authorized communication on user device 202 may comprise presenting an audible notification that the communication is authorized, such as by playing a ringtone, sound or audible message associated with authorized communications. In yet another embodiment, presenting a communication as an authorized communication on user device 202 may comprise presenting a tactile notification that the communication is authorized, such as by presenting a vibration indicating that the communication is authorized. In other embodiments, the communication may be presented in a normal fashion, or as user device 202 would usually present a communication.

In some embodiments, not presenting the communication may comprise blocking the communication or not forwarding the communication to user device 202.

In some embodiments, presenting a communication as an unauthorized communication on user device 202 may comprise visually indicating that the communication is unauthorized, such as by displaying a message, image, or light indicating that the communication is unauthorized. In another embodiment, presenting a communication as an unauthorized communication on user device 202 may comprise presenting an audible notification that the communication is unauthorized, such as by playing a ringtone, sound or audible message associated with unauthorized communications. In yet another embodiment, presenting a communication as an unauthorized communication on user device 202 may comprise tactile notification that the communication is unauthorized, such as by presenting a vibration indicating that the communication is unauthorized. In other embodiments, the communication may be presented in a normal fashion, or as user device 202 would usually present a communication.

In some embodiments, presenting a communication as an unknown communication on user device 202 may comprise presenting a visual notification that the communication is unknown, such as by displaying a message, image, or light indicating that the communication is unknown. In another embodiment, presenting a communication as an unknown communication on user device 202 may comprise presenting an audible notification that the communication is unknown, such as by playing a ringtone, sound or audible message associated with unknown communications. In yet another embodiment, presenting a communication as an unknown communication on user device 202 may comprise presenting a tactile notification that the communication is unknown, such as by presenting a vibration indicating that the communication is unknown. In other embodiments, the communication may be presented in a normal fashion, or as user device 202 would usually present a communication.

Accordingly, user device 202 may comprise a display device, such as a screen or light, an audio playing device, such as a speaker, and a tactile feedback device, such as a vibrator.

In some embodiments, computer executable instructions 206 may be configured to present, on user device 202, an option to designate an unauthorized or unknown sender as an unauthorized or authorized sender in the database. This may comprise displaying a menu to a user, wherein the user may be presented with an option to select or designate a sender as an unauthorized or authorized sender.

In some embodiments, computer executable instructions 206 may be configured to access a telephone contact list residing on or associated with user device 202 and designate contacts in the telephone contact list as authorized senders in the database. The telephone contact list could be a user's contact list associated with a user account or residing on his or her communication device.

Figure 1B:
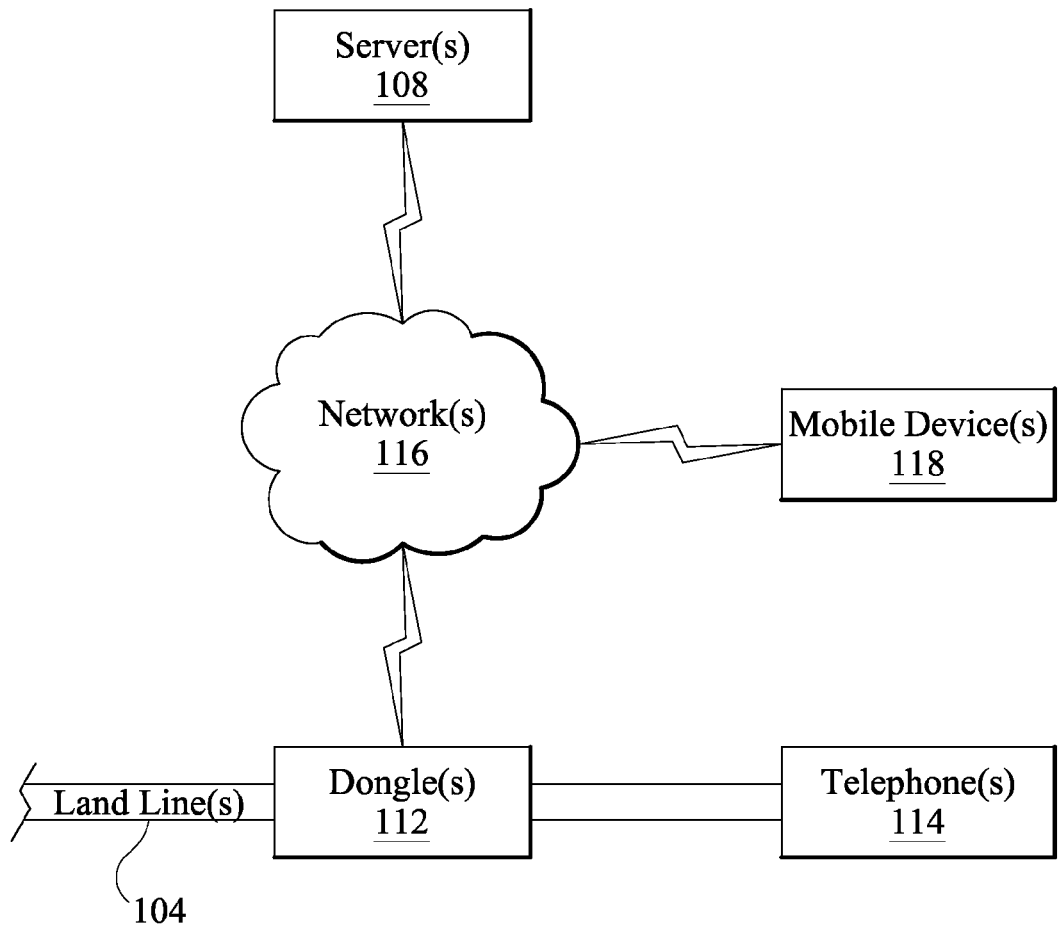
Figure 1C:
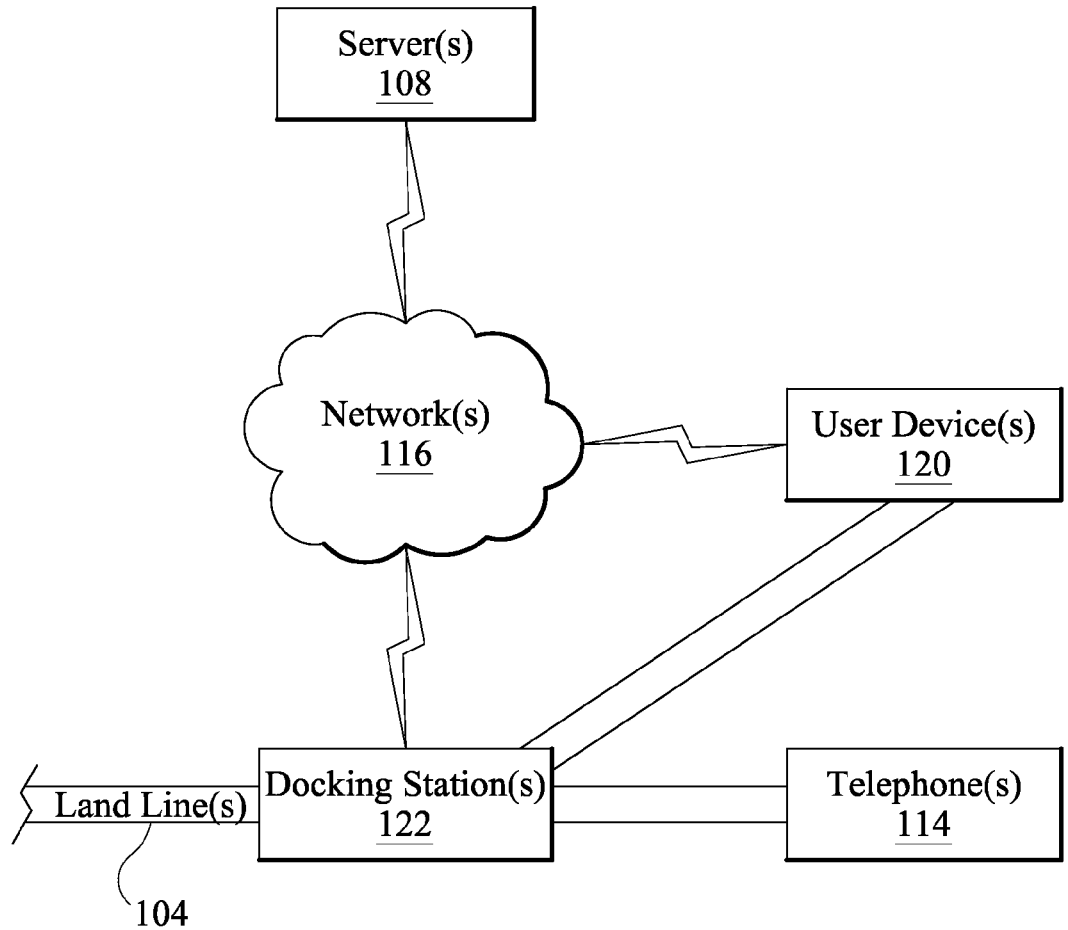

In further embodiments, user device 202, processor 204, and/or computer executable instructions 206 may comprise or perform any or all of those embodiments or functions of processor 102, user device 106, user device 120, docking station 122, dongle 112, mobile device 118, telephone 114, and computer executable instructions 110 described with references to FIGS. 1A-1C.

Figure 3:
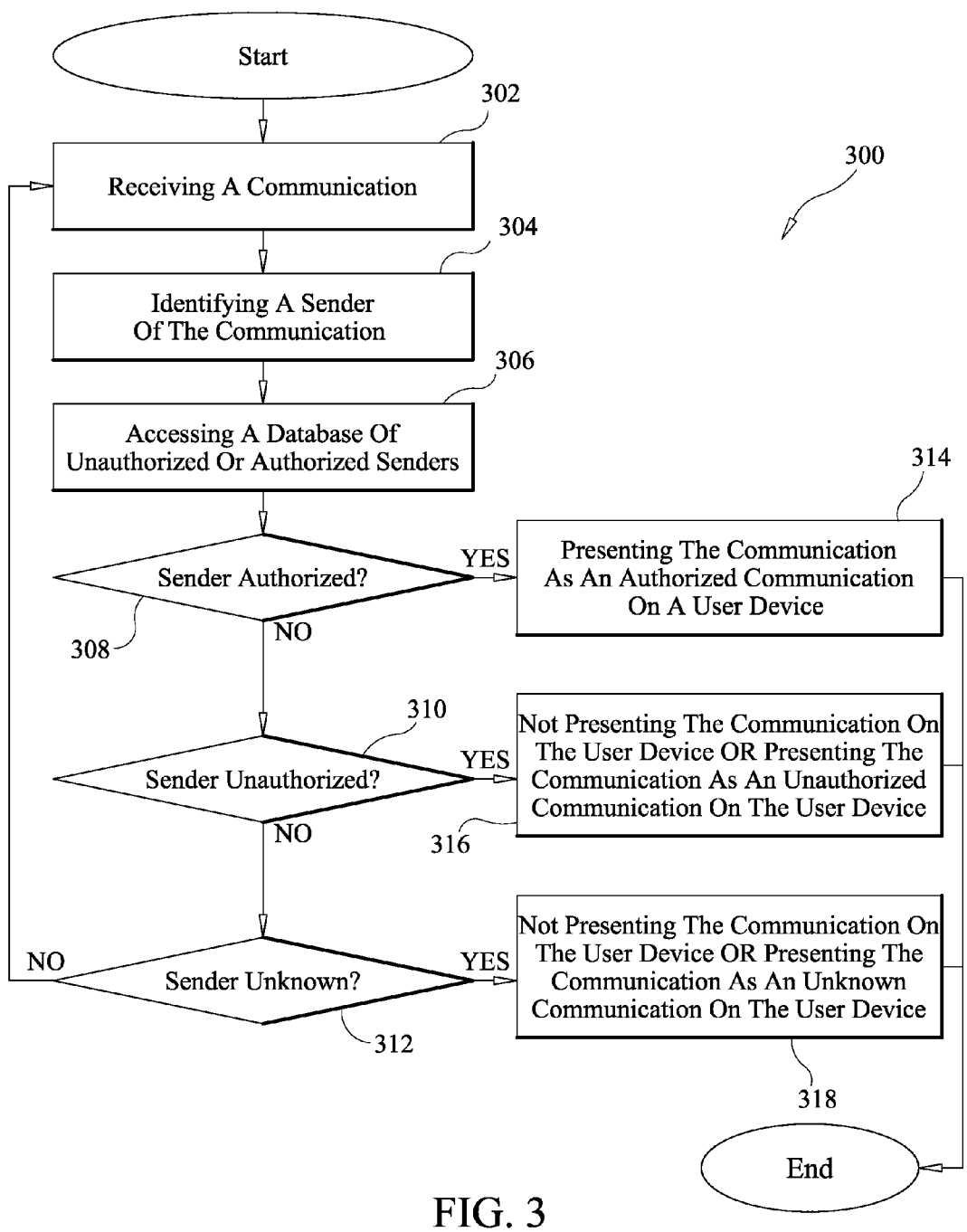
FIG. 3 shows a flow chart depicting a computer implemented method in accordance with one embodiment.

Referring now to FIG. 3, a flow chart is shown depicting a computer implemented method 300 for screening incoming communications, wherein method 300 comprises receiving a communication (block 302), identifying a sender of the communication (block 304), accessing a database of unauthorized or authorized senders (block 306), determining if the sender is unauthorized (block 308), authorized (block 310), or unknown (block 312), and if the sender is authorized, then presenting the communication as an authorized communication on a user device (block 314), if the sender is unauthorized, then not presenting the communication on the user device, or presenting the communication as an unauthorized communication on the user device (block 316); and if the sender is unknown, then not presenting the communication on the user device, or presenting the communication as an unknown communication on the user device (block 318).

In some embodiments, method 300 may comprise accessing a public do-not-call registry and designating contacts contained in the do-not-call registry as unauthorized senders in the database. The do-not-call registry may be hosted by a server, and the registry may be accessed electronically via a computer network.

In some embodiments, method 300 may comprise verifying that a sender is human. This may include requesting that a sender answer questions, input certain numbers (such as by phone), requesting that they leave a voicemail, requesting that they speak certain words, attempting to interrupt a robocall and see whether the automated robocall sender reacts, such as by stopping or answering the interruption, or using voice analysis software to determine the whether a sender is a human. If a sender is a human, then the communication may be presented on a user device, a notification indicating that the sender is human may be presented on the user device, or the sender may be designated as an authorized sender, and thus presented as an authorized sender.

In some embodiments, method 300 may be implemented by any or all of the embodiments of user devices, servers, docking stations, processor, computer executable instructions, or components thereof, described throughout the present disclosure. In yet another embodiment, method 300 may comprise any or all of those steps or functions performed by the various systems, methods, and computer executable instructions described throughout the present disclosure.

Exemplary Applications

Figure 4:
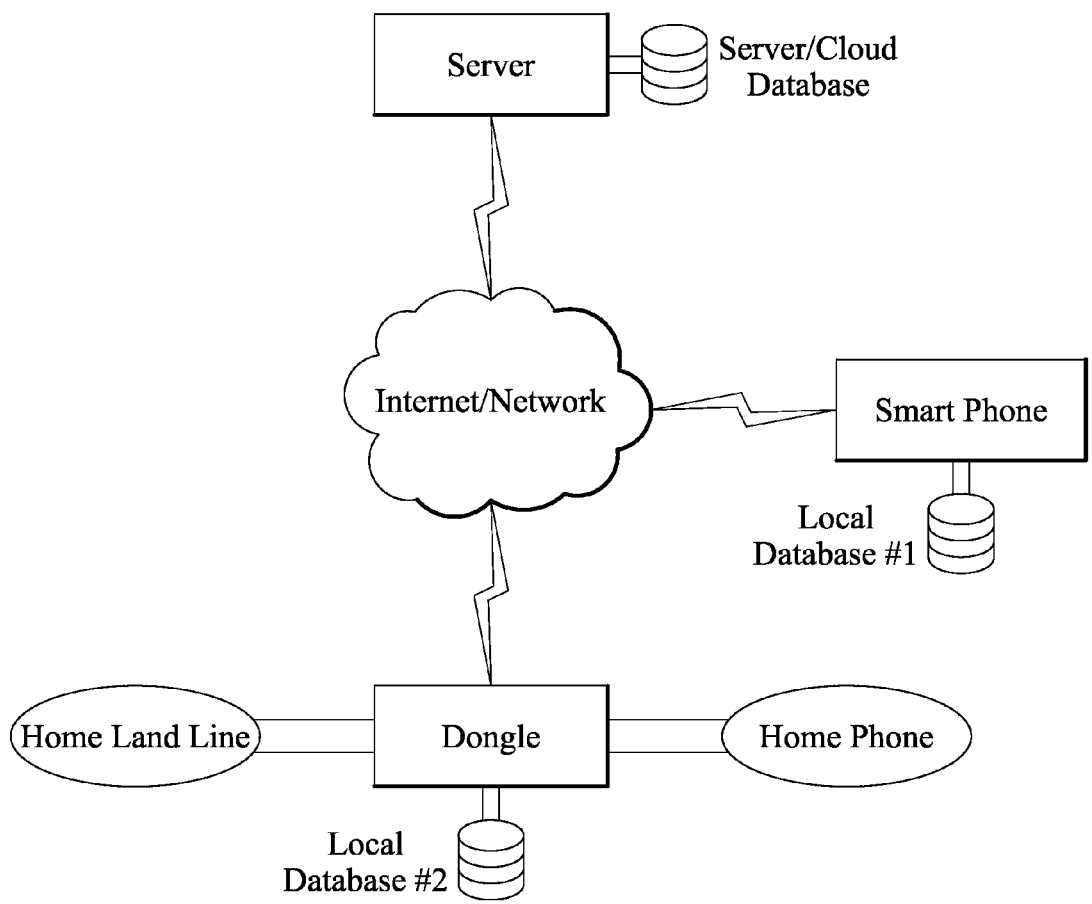
FIG. 4 shows a block diagram depicting a system in accordance with one embodiment.

Referring now to FIG. 4, an exemplary embodiment of a system for screening communications is shown, comprising:

A server configured to host a cloud synced database of authorized or blocked callers, phone numbers, or numbers associated with blocked merchant identification numbers.

A downloadable mobile application operating on a smartphone, wherein the application is configured to: intercept an incoming phone call; check a local database on the smartphone or server cloud database to determine if the incoming number is unknown, authorized or blocked; block the call if the number is blocked, or allow the call if the number is authorized; present a user with different ring tones or vibrations based on whether the call is blocked, authorized, or unknown (ring tones are user selectable); allow a user to answer or reject the call; allow a user to add an unknown number to an authorized or blocked list; allow a user to access user settings; and/or upload any changes to the cloud database on the server.

A home phone dongle that connects to the home telephone land line and a home phone, and connects to the server via the internet (WLAN), and is operative to: intercept an incoming land line phone call; check a local database on the dongle or server cloud database to determine if the incoming number is unknown, authorized or blocked; block the call if the number is blocked, or allow the call if the number is authorized; present a home user with different ring tones or vibrations based on whether the call is blocked, authorized, or unknown; allow a home user to answer or reject the call; allow a home user to add the number to an authorized or blocked list; allow a home user to access user settings; forward the incoming call information to the smartphone application so the smartphone user may carry out the functions set forth above, or allow the phone call to ring through on the home phone; and/or upload any changes to the cloud database on the server.

The databases may be all synced for quick local referencing of authorized/blocked numbers.

Calls forwarded to the smartphone from the landline are done voice over internet protocol ("VOIP"). Calls forwarded from the smartphone to the landline are done VOIP.

The dongle connects to internet via WLAN, LAN, cellular, or LTE.

The smartphone application can automatically access contacts on the smartphone, OUTLOOK®, ICLOUD®, GOOGLE®, and the like, and add the contacts to the authorized list on the cloud synced database, which will automatically allow the smartphone contacts to contact a user on the user's home land line.

Alternatively, the dongle may simply serve as a docking station for the smartphone, wherein the docking station could leverage the processing power and mobile application on the smartphone to carry out the features of the dongle set forth above.

Unknown numbers may be blocked unless they are on the Merchant Call list (hosted by a service provider).

The server can tap into a government do not call ("DNC") registry and include the blocked numbers list on the DNC registry, and add the DNC numbers onto the blocked numbers list.

Unknown callers may be allowed to request to be added to a user's authorized list, by presenting them with an automated menu, allowing them to leave voice mails, via text message, email, via the application, and the like.

Users can then decide whether to accept the request, block numbers, respond, counter request, or take no action.

The application/dongle may be operative to present incoming callers, especially unknown numbers, with a way to prove that they are human, such as by asking questions, request that they input certain numbers, analyzing their voice, asking them to speak words, attempting to interrupt the robocall, and the like.

A user's database may be synced with the do-not-call database.

Hardware and Operating Environment

This section provides an overview of example hardware and the operating environments in conjunction with which embodiments of the inventive subject matter may be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
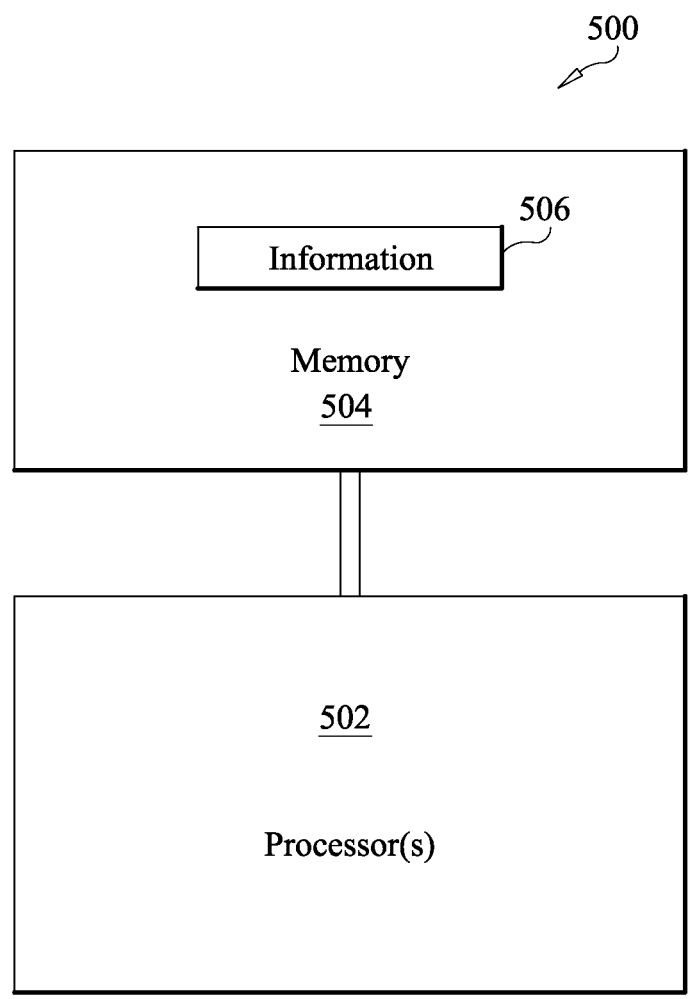
FIG. 5 shows a block diagram depicting an article in accordance with one embodiment.

FIG. 5 is a block diagram representing an article according to various embodiments. Such embodiments may comprise a computer, a memory system, a magnetic or optical disk, some other storage device, or any type of electronic device or system. The article 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both) which, when accessed, results in a machine (e.g., the processor(s) 502) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Accordingly, while the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for screening incoming communications comprising:
    a processor configured to sync screening functions and settings across a plurality of devices and connect to a telephone land line, a local user device, and a remote server; and
    computer executable instructions readable by the processor and configured to:
        receive an incoming communication via the telephone land line;
        identify a sender of the communication;
        access a database of unauthorized or authorized senders;
        determine if the sender is unauthorized, authorized, or unknown; and
        if the sender is authorized, then present the communication as an authorized communication on the local user device;
        if the sender is unauthorized, then:
            not present the communication on the local user device; or
            present the communication as an unauthorized communication on the local user device; and
        if the sender is unknown, then:
            not present the communication on the local user device; or
            present the communication as an unknown communication on the local user device.

2. The system of claim 1, further comprising a dongle, wherein the dongle comprises the processor and at least one connection module configured to connect to the telephone land line, the local user device, or the remote server.

3. The system of claim 1, wherein presenting the communication as an authorized communication on the local user device comprises presenting a notification associated with authorized communications on the local user device.

4. The system of claim 1, wherein presenting the communication as an unauthorized communication on the local user device comprises presenting a notification associated with unauthorized communications on the local user device.

5. The system of claim 1, wherein presenting the communication as an unknown communication on the local user device comprises presenting a notification associated with unknown communications on the local user device.

6. The system of claim 1, wherein the computer executable instructions are configured to present, on the local user device, an option to designate an unauthorized or unknown sender as an unauthorized or authorized sender in the database.

7. The system of claim 1, wherein the computer executable instructions are configured to present the communication to a remote user device.

8. The system of claim 1, further comprising a docking station configured to connect to the home land line and configured to receive a mobile user device, wherein the mobile user device comprises the processor.

9. The system of claim 1, wherein the database comprises a local database, and wherein the computer executable instructions are configured to sync the local database and a remote database.

10. A system for screening incoming communications comprising:
    a user device comprising a processor; and
    computer executable instructions readable by the processor and configured to:
        sync screening functions and settings across a plurality of devices;
        receive an incoming communication;
        identify a sender of the communication;
        access a database of unauthorized or authorized senders;
        determine if the sender is unauthorized, authorized, or unknown; and if the sender is authorized, then present the communication as an authorized communication on a user device;
        if the sender is unauthorized, then:
            not present the communication on the user device; or
            present the communication as an unauthorized communication on the user device; and
        if the sender is unknown, then:
            not present the communication on the user device; or
            present the communication as an unknown communication on the user device.

11. The system of claim 10, wherein presenting the communication as an authorized communication on the user device comprises presenting a notification associated with authorized communications on the user device.

12. The system of claim 10, wherein presenting the communication as an unauthorized communication on the user device comprises presenting a notification associated with unauthorized communications on the user device.

13. The system of claim 10, wherein presenting the communication as an unknown communication on the local user device comprises presenting a notification associated with unknown communications on the user device.

14. The system of claim 10, wherein the computer executable instructions are configured to present, on the user device, an option to designate an unauthorized or unknown sender as an unauthorized or authorized sender in the database.

15. The system of claim 10, wherein the database comprises a local database, and wherein the computer executable instructions are configured to sync the local database and a remote database.

16. The system of claim 10, wherein the computer executable instructions are configured to access a telephone contact list associated with the user device and designate contacts in the telephone contact list as authorized senders in the database.

17. A computer implemented method for screening incoming communications comprising:
    sync screening functions and settings across a plurality of devices;

receiving an incoming communication via the telephone land line;
identifying a sender of the communication;
accessing a database of unauthorized or authorized senders;
determining if the sender is unauthorized, authorized, or unknown; and
if the sender is authorized, then presenting the communication as an authorized communication on a user device;
if the sender is unauthorized, then:
  not presenting the communication on the user device; or
  presenting the communication as an unauthorized communication on the user device; and
if the sender is unknown, then:
  not presenting the communication on the user device; or
  presenting the communication as an unknown communication on the user device.

18. The computer implemented method of claim 17, further comprising accessing a public do-not-call registry and designating contacts contained in the do-not-call registry as unauthorized senders in the database.

19. The computer implemented method of claim 17, further comprising verifying that a sender is human.

20. The computer implemented method of claim 17, further comprising presenting senders with an option to request to be designated as an authorized sender in the database.

* * * * *